Figure 6:
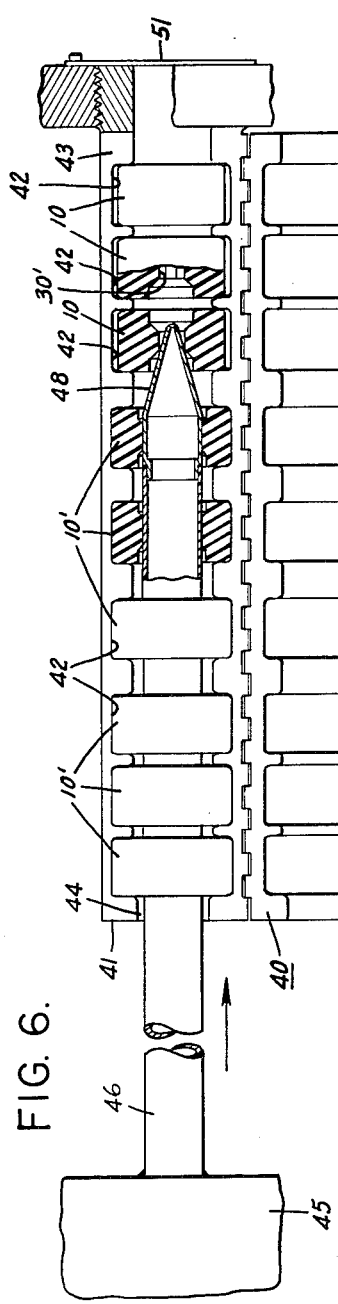

Aug. 10, 1965  G. BAECHLI  3,199,663
CONVEYING APPARATUS
Original Filed May 15, 1957  2 Sheets-Sheet 1
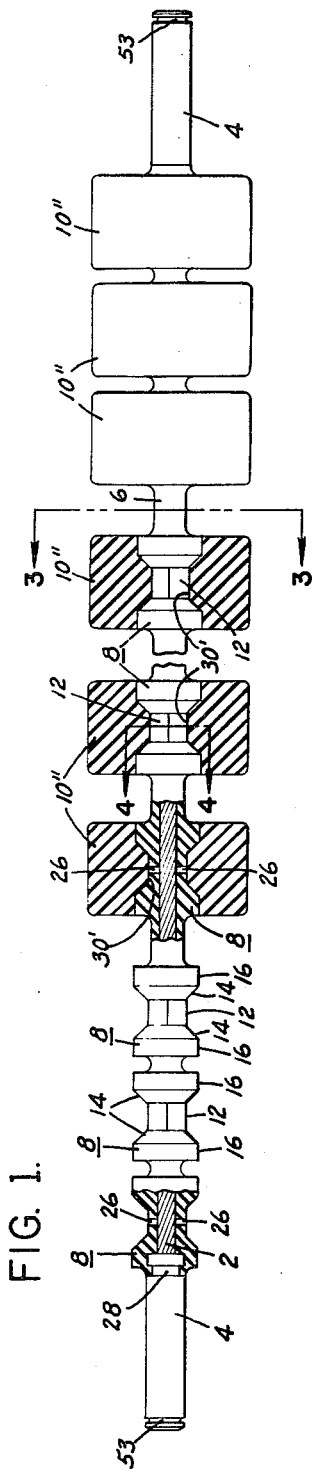
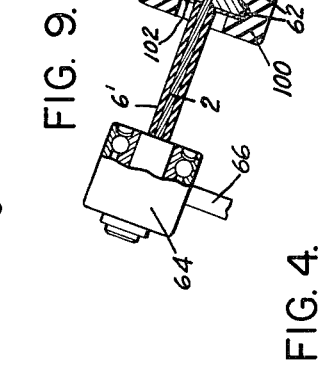
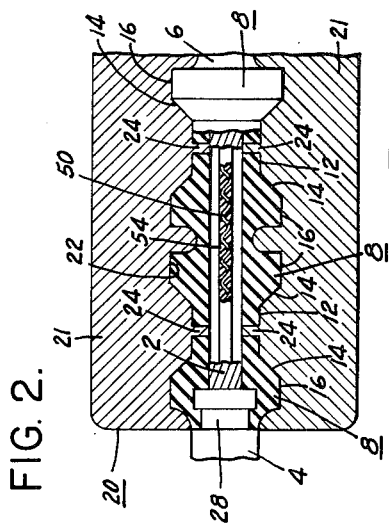
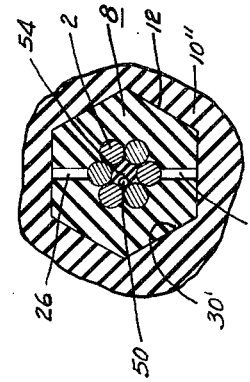
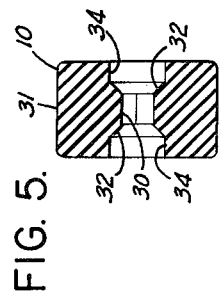
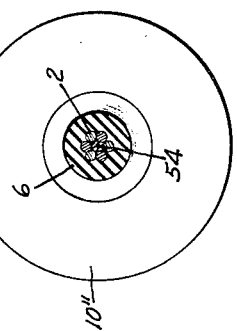
INVENTOR.
GEORGE BAECHLI
BY
ATTORNEY

INVENTOR.
GEORGE BAECHLI
ATTORNEY

United States Patent Office 3,199,663
Patented Aug. 10, 1965

3,199,663
CONVEYING APPARATUS
George Baechli, New Philadelphia, Ohio, assignor to Joy Manufacturing Company, Pittsburgh, Pa., a corporation of Pennsylvania
Continuation of application Ser. No. 659,352, May 15, 1957. This application Aug. 20, 1962, Ser. No. 219,811
14 Claims. (Cl. 198—192)

My invention relates to conveying apparatus and more particularly to a new and improved rotatable suspension idler for an endless conveyor belt comprising an elongated flexible cable having a plurality of longitudinally spaced rollers secured thereto.

This application is a continuation of my previously filed application entitled Conveying Apparatus, Serial No. 659,352, filed May 15, 1957, now abandoned, which application was a continuation in part of my previously filed application entitled Suspension Troughing Idler, Serial No. 580,641, filed April 25, 1956, now abandoned, and which applications were assigned to the same assignee as this invention. Heretofore some suspension idlers for conveying apparatus have been formed by molding a number of fairly large rollers in longitudinal spaced relationship along an elongated flexible cable. One problem encountered with such a molded construction is that it is difficult to obtain concentricity between each of the rollers and the flexible cable due to the sagging of the flexible cable in the mold. Prior attempts to eliminate such sagging have been fairly satisfactory, however they have entailed additional operations which have added to the cost of such a device. Such molded structures have also required a substantial bulk of material so that the curing time for material is quite long. In addition prior suspension idlers which are formed in various manners have required a fairly large starting torque due to the turning resistance of the flexible member upon which the rollers are mounted.

Accordingly one object of my invention is to provide a new and improved suspension idler for conveying apparatus employing an elongated flexible member which has a resilient core extending centrally therethrough.

Another object of my invention is to provide a new and improved suspension idler for conveying apparatus comprising an elongated flexible shaft having longitudinally spaced hub portions secured thereto which are concentric with respect to the shaft.

Another object of my invention is to provide a new and improved suspension idler for conveying apparatus comprising an elongated flexible member having a plurality of longitudinally spaced hub portions secured thereto, each of which is encircled by an annular roller.

Still another object of my invention is to provide a new and improved method of assembling a suspension idler for conveying apparatus.

A more specific object of my invention is to provide a new and improved suspension idler for conveying apparatus comprising an elongated flexible member which is completely enclosed by means of a molded sheathing which sheathing is formed at spaced intervals to provide hub portions for receiving rollers thereon.

Still another more specific object of my invention is to provide a new and improved suspension idler for conveying apparatus comprising a hub portion with a portion thereof being of a non-circular configuration which engages the bore of an annular roller.

Another more specific object of my invention is to provide a new and improved method for assembling a suspension idler for conveying apparatus by expanding an annular roller, locating the roller so as to encompass a hub portion and releasing the roller to engage the hub portion.

In the accompanying drawings there are shown for the purpose of illustration several forms which the invention, from its apparatus aspect, may assume in practice and the manner of practicing the invention from its method aspect.

In these drawings:

FIGURE 1 is a side elevational view of a suspension idler constructed in accordance with the principles of my invention with some rollers thereof being omitted and with some portions being shown in section, FIGURE 2 is an enlarged partial cross sectional and partial side elevational view of an end portion of the flexible cable as shown in FIGURE 1 located in a mold for forming a sheathing on said cable.

Figure 7:
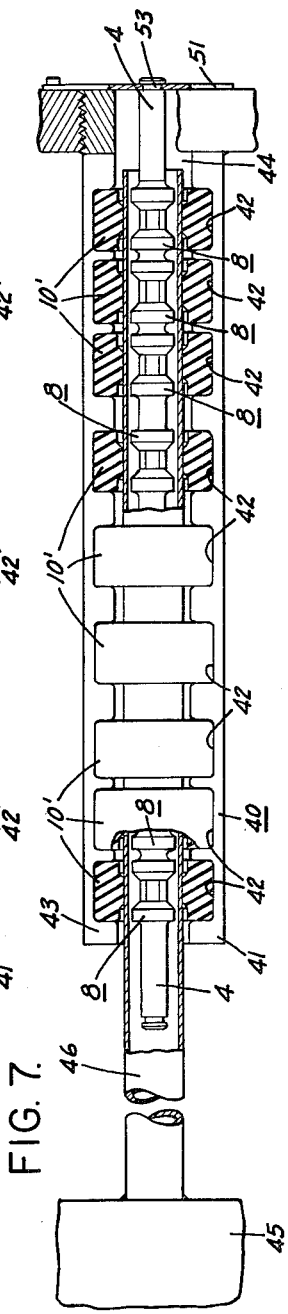
Figure 8:
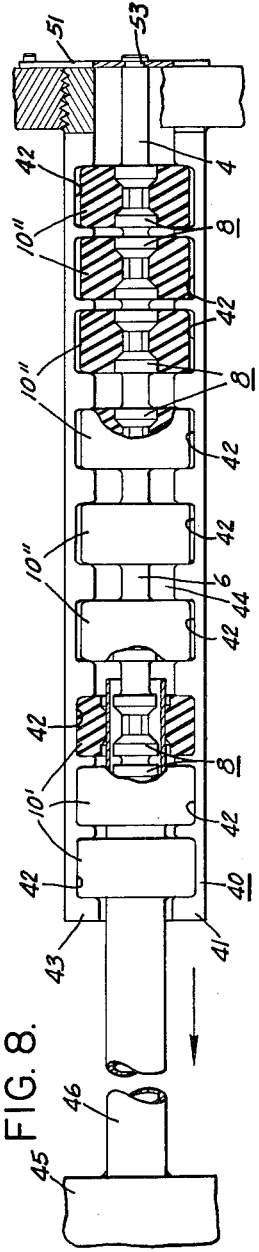

FIG. 3 is a cross sectional view of a suspension idler as shown in FIGURE 1 taken substantially along the lines 3—3 thereof, FIGURE 4 is a cross sectional view of a suspension idler as shown in FIG. 1 taken substantially along the lines 4—4 thereof, FIGURE 5 is a cross sectional view of a roller constructed in accordance with the principles of my invention, FIGURE 6 is a plan view, with portions thereof shown in section, of an opened support having a plurality of annular rollers therein and through which rollers a headed hollow ram shaft is being forced in one direction, FIGURE 7 is a plan view partially in section similar to FIGURE 6 with the head of the ram shaft removed and with a flexible shaft located within the hollow ram shaft, FIGURE 8 is a plan view partially in section similar to FIGURE 6 with the ram shaft moving in the reverse direction; and FIGURE 9 is a partial side elevational and partial cross sectional view of one end of another suspension idler constructed in accordance with the principles of my invention.

Referring to FIGS. 1-4 it will be noted that a suspension idler for conveying apparatus constructed in accordance with the principles of my invention comprises an elongated flexible shaft 2 which may be formed from any suitable flexible material having sufficient strength such as a stranded steel wire cable. The shaft 2 has suitable elongated hollow sleeves 4, such as steel, rigidly secured to each of its ends, respectively, in any suitable manner such as by being swedged thereto to facilitate supporting the suspension idler between spaced supports for rotational movement. For a more particular and illustrative showing and description of such support of a suspension idler the above identified copending application is again referred to. The outer periphery of the shaft 2 between the sleeves 4 is completely enclosed by means of a sheathing 6 which is firmly secured to the shaft 2 in any suitable manner, preferably by being molded thereto so that the inner portion of the sheathing enters the interstices between the strands of wire of the shaft 2 as more particularly described herinafter. As shown, the sheathing 6 is formed along the length of the shaft 2 to provide a plurality of identical, longitudinally spaced, elongated, outwardly extending hub portions 8 each of which is encompassed by an annular roller 10 (FIGURE 5) as hereinafter described. Each hub portion 8 is symmetrical and concentric with the shaft 2 and comprises a formed central portion 12 having a tapered portion 14 extending longitudinally and outwardly at each end thereof and each of which tapered portions 14 terminates in a cylindrical end portion 16.

As indicated the sheathing 6 is preferably molded on the shaft 2 and in view of the fact that the shaft 2 is rotated in use is preferably formed from a molded material having a high strength and crack resistance such as neoprene. In addition one or more of the ozone, sunlight acid and flame resistance properties of neoprene are desirable in many installations, however, if desired, the sheathing 6 may be formed of any material which may suitably be provided with the described form and be firmly secured to the shaft 2. In order to mold the sheathing 6 uniformly around the shaft 2, the shaft 2 is centrally supported within a split mold 20, only a portion of which is shown in FIGURE 2, having identical halves 21, which are placed together to form an elongated cavity 22 therein in the form of the outer surface of the sheathing 6. Inasmuch as such molds and molding processes are well known in the art further description and illustration thereof are not believed to be necessary. It will be noted, however (FIGURES 2 and 4), that the central portion 12 of each hub portion 8 is provided with a pair of central diametrically opposed elongated openings 26 which extend outwardly from the outer surface of the shaft 2 to the outer surface of the central portion 12. The openings 26 are formed by means of pins 24, shown only in cross section in FIGURE 2, which are formed integral with each half 21 of the mold 20 and extending inwardly of the cavity 22 into engagement with the upper and lower surfaces of the shaft 2. The use of pins such as pins 24 to support a flexible cable in a mold has been employed before; however, with the entire roller being molded on the shaft 2 the shaft engaging pins must be located between the spaced rollers so that sagging of the shaft between the pins can occur. With the structure as described and shown the pins 24 are located centrally of each hub portion 8 without reference to the longitudinal spacing of the hub portion 8 along the shaft 2 so that the center of each hub portion 8 is coincident with the centers of the shaft 2. In addition, if desired, the sheathing 6 may be formed to extend outwardly over the inner portion of the sleeves 4 to engage a groove 28 therein whereby the sheathing 6 is sealed to each sleeve 4 to prevent moisture from seeping under either end of the sheathing 6.

The rollers 10 (FIGURE 5) may be formed from any suitable resilient material which may suitably be formed to the desired hereinafter described shape. As before, particular installations may require a neoprene roller which is molded to the desired shape. In many installations, a roller which is molded from crude rubber, or the like, may be desirable due to its fairly low cost. As shown, each roller 10 is provided with a flat cylindrical outer surface 31 which engages and supports a moving conveyor belt (not shown). If desired, the outer surfaces 31 of the various rollers may be provided with any desired belt engaging shape. Each roller 10 has a central bore extending therethrough which preferably has the same configuration as the outer surface of the hub portions 8. In order to accomplish the purposes of my invention it will be noted that the end portions 16 which form the outermost portion of the hub portions 8 have a diameter less than half the radius of the rollers 10 although other proportions therefor may be employed. Thus, the bore of each roller 10 is provided with a central inwardly extending projection having an innermost surface 30 engageable with the outer surface of the central portion 12 of a hub portion 8, axially and outwardly extending surfaces 32 at each end of the central projection which are engageable with the spaced tapered portions 14 of a hub portion 8, and circular surfaces 34 which extend outwardly from the surfaces 32, respectively, and which are engageable with the spaced cylindrical portions 16 of a hub portion 8. The bore of each roller 10 is substantially the same length as and normally of smaller transverse cross section than the hub portions 8 in order to obtain a firm engagement therwith as hereinafter described.

In order to accomplish the novel method of assembling a suspension idler of my invention a split support 40 (shown in an open position in FIGURE 6 and with one half removed in FIGURES 7 and 8) is provided which comprises a pair of substantially identical elongated members 41 having a pair of engageable flat surfaces 43. Each of the members 41 is provided with a number of longitudinally spaced, parallel, semicylindrical recesses 42 which extend inwardly of the flat surfaces 43 so that when the members 41 are placed with their surfaces 43 in engagement the recesses 42 of each member 41 are laterally aligned. The members 41 may be hinged together to facilitate their being closed together; however, prior to their being closed rollers 10 are inserted in the aligned recesses 42—42, respectively. Each of the aligned recesses 42—42 are of a size to closely receive the sides of the rollers 10 therein and are larger in diameter than the rollers 10 to permit radial expansion of the rollers 10. It will also be noted that each of the members 41 is provided with a semicylindrical bore 44 extending longitudinally thereof and centrally of each of the recesses 42 whereby a central passageway extends through the entire length of the support 40 when the members 41 are closed together. Once the members 41 are closed together to form the support 40 they may be restrained against undesirable opening in any suitable manner.

As shown in FIGURE 6, a suitable elongated hollow ram shaft 46 is provided having an axially outwardly tapered removable head 48 at one of its ends. The shaft 46 has an outside diameter greater than the portion of the bore of the rollers 10 having the largest diameters. As shown, the inner portion of the head 48 is recessed inwardly to be slidably received within the head end of the shaft 46. The other end of the shaft 46 is secured in any suitable manner to any suitable actuating means, such as a plate 45 of a hydraulically operated press (not shown) for forcing and retracting the ram shaft 46 through the bores of the rollers 10 in the support 40. Inasmuch as such presses are well known, a description thereof is not believed to be necessary. The head 48 is initially forced forwardly by the actuating means through the outer portion of the passageway in the support 40 formed by the bores 44 into engagement with the bore of the end roller 10 of the line of rollers 10. Due to the fact that the rollers 10 are smaller in diameter than the cylinders formed by the aligned recesses 42 the rollers 10 may be somewhat misaligned with respect to the central longitudinal axis of the support 40. However, due to the taper of the head 48, the engagement of the head 48 with the bore of the end roller 10 will align the engaged roller 10 with respect to shaft 46. Upon further forward forcing of the shaft 46 through the support 40 the first roller 10 will be expanded radially outwardly to form a compressed roller 10' having its outer surface engaging the inner surfaces of the aligned recesses 42. Due to the force exerted by the compressed roller 10' upon the shaft 46 the shaft 46 will be located substantially centrally within the aligned recesses 42. The forward movement of the ram shaft 46 through the other aligned rollers 10 is continued so that each of the rollers 10 is expanded to form a roller 10' and the shaft 46 extends entirely through the bore of each roller 10'. It will be appreciated that as the rollers 10' are compressed radially by means of an axially moving ram shaft 46, the rollers must be formed from a material which will permit the desired radial enlargement thereof. Further as the central projections are slidably engaged by the outer surface of the ram shaft 46 they are of a length to prevent any tearing by the movement of the ram shaft 46 over the surface 30 thereof.

Once the ram shaft 46 has passed completely through the aligned rollers 10' movement of the ram shaft 46 is stopped and the head 48 is removed so that the head end of the ram shaft 46 is accessible through the end of the central passageway in the support 40 opposite that from which the ram shaft 46 enters. If desired, the bores 44 may be laterally enlarged to enlarge the passageway and facilitate removal of the head 48. After removal of the head 48 the flexible shaft 2 with the sheathing 6 and sleeves 4 thereon, as heretofore, described, is inserted within the hollow ram shaft 46 so that each hub portion 8 is laterally aligned with respect to one of the expanded rollers 10'. It will be obvious that the spacing of the hub portions 8 must correspond with the spacing of the aligned recesses 42 in order to obtain alignment therebetween. Such alignment is obviously a matter of proper dimensioning of the described components before the assembly operation. If desired, a rapid means for properly aligning the hub portios 8 and the expanded rollers 10' may be provided on one of the members 41 adjacent the free end of the ram shaft 46 with comprises a pair of pivotally supported elongated clasping members 51 which are movable into indexing engagement with the free end of the flexible shaft 2. For indexing purposes the clasping members 51 may closely engage a groove 53 in the sleeve 4 adjacent the free end of the ram shaft 46 which groove 53 is also employed for other purposes as described in the above identified application.

Once the shaft 2 is located properly within the ram shaft 46, the ram shaft 46 is withdrawn in the reverse manner in which it is inserted, as shown in FIGURE 8. As the ram shaft 46 is withdrawn from each of the rollers 10' each of the rollers 10' is free to contract and snap or pop over the hub portion 8 aligned therewith. As previously indicated the bore of each roller 10 is normally smaller than the hub portions 8 so that upon the engagement of a released roller 10' with a hub portion 8 a roller 10" will be formed which has a bore bigger than the normal bore of the roller 10 and smaller than the bore of a roller 10'. Thus, the rollers 10" will exert a uniform compressive force upon the hub portions 8 due to its resiliency and continued enlargement by the hub portions 8. Due to such force between the hub portions 8 and the rollers 10" the mating surfaces will be squeezed together so that liquids will not seep therebetween. As can be appreciated the force exerted between the hub portion 8 and the expander roller 10" will be dependent upon the degree that the roller 10" is prevented from returning to the normal shape of the roller 10, which, in turn, is dependent upon the size of the hub portion 8 with respect to the normal size of the bore of the roller 10. It will be appreciated that in order to increase the force between the hub portion 8 and the roller 10" the bore of the roller 10 must be decreased in size so that it is necessary to expand the bore of the roller 10 a greater distance so that the compressibility and elongation characteristics of the roller 10 will be the limiting factors of the force therebetween which is obtainable. As heretofore described the shaft 2 is merely slipped into the ram shaft 46, however, if desired, in order to obtain a greater force between the outer edges of the hub portion 8 and the roller 10" the hub portion 8 may be forced into the ram shaft 46 so that the end portions 16 are compressed toward the shaft 2.

As the ram shaft 46 is withdrawn the roller 10' will contract uniformly radially inwardly and form the roller 10". During such construction period the surfaces 32 of each roller are engageable with the spaced tapered portions 14 of a hub portion 8. In the event of any lateral misalignment between a roller 10' and its cooperable hub portion 8 the engagement of such surfaces will shift the roller longitudinally of the shaft 2 due to the resiliency of the roller to insure that the roller 10" is properly aligned with a hub portion 8.

It will be appreciated that the bore of a roller 10 and the outer configuration of a hub portion 8 may be of any desired configuration whereby at least some portions are compresseed by their engagement with each other. Thus, as shown in FIGURE 4 the central portion of the hub portion 8 and the innermost surface 30' of the roller may be polygonal desirably hexagonal in cross section to overcome any turning effect of the roller 10" on a hub portion 8. It will be realized that the surface 30 heretofore described will be enlarged to form a similar surface 30' around the central portion of the hub portion 8. Such a hexagonal cross section of bore of a roller 10 will not offer any substantially greater resistance to the passage of the ram shaft 46 therethrough as compared to a circular cross section and will provide an additional interlocking between the central portion 12 of a hub portion 8 and a roller 10". Of particular note is the fact that the flat sides of the hexagonal sections need not be aligned with each other prior to the withdrawal of the same shaft 46 as, due to the resiliency of the rollers 10", the rollers 10" are readily rotatable around the hub portion 8 until the flat lands of each hexagonal section are engaged.

Although, as indicated, the heretofore described structure may be employed with any suitable flexible shaft 2, as shown in FIGURES 3 and 4, I preferably employ a commerically available shaft having an elongated coil spring 50 extending longitudinally through the center thereof. With such a shaft a bore extends longitudinally through the shaft. Thus, when the sheating 6 is molded on the shaft 2 as heretofore described the molding material is forced around the strands of the shaft 2 and between the coils of spring 50 into the bore whereby an elongated resilient core 54 of molding material extends longitudinally through the shaft 2. With such a structure any torque which is applied to the shaft 2 is transmitted uniformly along the core 54, due to its resiliency, so that less torque is required to start or maintain the entire assembly rotating as compared with a flexible steel cored shaft as heretofore employed.

The structure as heretofore described has numerous advantages other than these previously pointed out. Of great importance is the fact that the shaft 2 is supported in the mold 20 by means of pins 24 which are located between the ends of the hub portion 8. By so locating the pins 24 and thereafter locating the roller 10", as indicated, so as to encircle the opening 26 formed thereby, there is substantially no likelihood that moisture, acid, or other deleterious matter will seep between the roller 10" and a hub portion 8 to cause deterioration of the portions of the shaft 2 at the bottoms of the openings 26. If desired, however, a further coating of resilient material such as neoprene may be applied in any suitable manner, such as by dipping, to the outer surface of the roller 10" and the hub portions 8 to prevent any seepage of substances therebetween. Or, if desired, a glue or cement may be applied to the outer surfaces of each hub portion 8 to fill any void between the hub portions 8 and the bores of the roller 10". In addition, such a glue or cement would provide an additional bond between the rollers 10" and the hub portions 8. Still another advantage of my structure over prior structures in which the rollers are molded directly on the shaft 2 is that due to the diameter of the hub portions 8 less curing time is required for the sheathing 6 and smaller molds may be employed.

FIGURE 9 illustrates another modification of my invention in which like parts have been identified by the same reference numerals and in which parts serving the same functions have been identified by the same reference numerals primed. In this embodiment a plurality of cylindrical hub portions 8' which may be composed of plastic material flowable when heated such as molten metal, desirably aluminum, are rigidly secured in longitudinally spaced relationship to the shaft 2 in any suitable manner such as more clearly described in the above identified copending application. As shown each hub portion 8' extends a greater distance outwardly of the shaft 2 from the hub portions 8 previously described and is provided with a central inwardly extending V-shaped groove 60 to form a pair of axially spaced circular projections 62 extending outwardly around the outer periphery thereof. A sheathing 6' is rigidly secured to the outer surfaces of the shaft 2 and the hub portions 8' so that the outer surface of the shaft 2 between the sleeves 4 (only one of which is shown) and the entire outer surface of each hub portion 8' are enclosed thereby. The sheathing 6' may be formed from any suitable material to prevent corrosion of either the hub portion 8' or the shaft 2, which may be bonded or molded to the outer surface of the shaft 2 and the hub portion 8' in any suitable manner. As before, in view of its high elasticity and its corrosion resistance properties a neoprene sheathing 6' is preferred.

Annular rollers 100 are secured in longitudinal spaced relationship along the shaft 2 to the hub portion 8' respectively, in any suitable manner such as that previously described to form a complete suspension idler. Although as heretofore described a "pop-on" construction may be employed, it should be noted that if desired the bore of each roller 100 may be individually expanded in any suitable manner and mounted over the outer surface of a hub portion 8'. Each of the rollers 100 is provided with a pair of axially spaced grooves 102 extending inwardly thereof and around its inner bore which are axially spaced and of a configuration to engage the projection 62 on the hub portion 8' upon which it is located. Although not shown in the normal or unexpanded state, it is to be realized that each of the rollers 100 are preferably expanded from the normal state when located on the hub portion 8' in order to obtain a force acting therebetween as heretofore described. If desired, however, such compressive force may be eliminated and the rollers 100 or the rollers 10 as heretofore described may be glued or cemented to the outer portion of the sheathing 6' or a non-circular configuration may be employed between the bore of the rollers 100 and the outer portion of the hub portion 8'. Of particular note is that this modification of my invention illustrates the fact that the outer portion of the hub portion of a suspension idler may be made encircled by the roller. Although as described the sheathing 6' completely encloses the outer portion of the hub portion 8' in view of the roller 100 encircling such portion the sheathing 6' need not be applied thereto. FIGURE 9 also shows that the sleeves 4 are rotatably supported by means of a supportable bearing 64 which is secured to the supportable stationary support 66, shown only in part, and a conveyor belt 68 extending across the outer surface 31' of the rollers 100.

While there are in this application specifically described various forms which the invention, from its apparatus aspect, may assume in practice, and one embodiment of the invention, from its method aspect, it will be understood that these forms and the method are disclosed for purposes of illustration and that the invention may be modified and embodied in various other forms and practiced in various other ways without departing from its spirit or scope of the appended claims.

I claim:

1. A suspension idler for conveyor apparatus comprising, an elongated striated flexible member having rotatably supportable spaced portions, said flexible member having a bore extending longitudinally therethrough, non-metallic resilient means molded within and around said flexible member, said resilient means forming a solid resilient core within said bore of said flexible member and a sheathing having a plurality of spaced hub portions extending outwardly around said flexible member intermediate said spaced portions, and roller means mounted on said hub portions respectively.

2. A suspension belt-troughing idler structure including spaced elements supporting bearings in inwardly tilted positions, a flexible, peripherally grooved, wire cable extending between said bearings and having at its opposite ends inflexible sleeve portions surrounding it and secured to it and supported by said bearings, metallic hub portions having homogeneous body portions cast directly upon said cable with portions of the inner peripheries thereof in direct interlocking engagement with the grooves in the periphery of the cable, and the metal of said hub portions being of a lower specific gravity than that of said cable.

3. A conveyor idler comprising an elongated flexible wire cable adapted to extend between spaced bearings for rotatable support thereby, said wire cable having a plurality of spaced grooves in its outer surface, a plurality of idler structures mounted in spaced relation to each other on said cable each having outer and inner peripheries, said outer peripheries being adapted to engage a belt for supporting and guiding the same, and said inner peripheries each comprising a metallic portion bonded directly upon said cable to effect a permanent interlock with said cable.

4. A conveyor idler comprising an elongated flexible member adapted to extend between spaced bearings for rotatable support thereby, said flexible member having at least spaced portions with a striated outer surface, spaced sleeve portions spaced longitudinally outwardly of said spaced portions and rigidly secured to said flexible member, a plurality of idler structures mounted in spaced relation to each other on said flexible member each having outer and inner peripheries, said outer peripheries being adapted to engage a belt for supporting and guiding the same, and said inner peripheries each comprising a metallic portion cast or molded directly upon said flexible member to effect a permanent interlock with said striations thereon.

5. A conveyor idler comprising, an elongated flexible wire cable adapted to be supported for rotational movement, said cable having at least spaced portions with a striated outer surface, a plurality of metallic hub portions mounted in spaced relation to each other on said cable each of which has a central portion bonded directly to one of said spaced portions of said cable to effect a rigid interlock with said striations thereof, and each of said hub portions having an inwardly extending groove extending around its outer periphery with a non-metallic resilient ring disposed therein to extend outwardly from said hub portions for engaging a belt.

6. A conveyor idler comprising, an elongated flexible wire cable adapted to be supported for rotational movement, said cable having at least spaced portions each with a striated outer surface, a plurality of metallic hub portions mounted in spaced relation to each other on said cable each of which has a central portion bonded to one of said spaced portions of said cable to effect a rigid interlock with said striations thereof, each of said hub portions having an inwardly extending groove extending around its outer periphery with a non-metallic resilient ring disposed in said grooves respectively to extend outwardly from said hub portions, and said resilient rings having a plurality of shaped outer peripheries, respectively, for engaging a movable belt.

7. A conveyor idler assembly comprising, a metallic flexible member adapted to be supported for rotational movement, a plurality of metallic hub portions rigidly secured to said flexible member in spaced relationship, each of said hub portions having a groove extending inwardly thereof around its outer periphery, a non-metallic resilent sheathing bonded to said hub portions and said flexible member to enclose same, and annular members formed from the same material as said sheathing and secured to said hub portions within said grooves, respectively.

8. A conveyor idler assembly comprising, a metallic flexible member having spaced portions supported by bearings to permit rotational movement of said flexible member therebetween, a plurality of metallic hub portions rigidly secured in spaced relationship to said flexible member between said bearings, each of said hub portions having a groove extending inwardly thereof around its outer periphery, a resilient sheathing bonded to said hub portions and said flexible member to enclose same, said sheathing also being bonded to at least a portion of said spaced portions of said flexible member, and annular members formed from the same material as said sheathing and secured to said hub portions within said grooves, respectively.

9. A conveyor idler comprising, a metallic flexible member adapted to be supported for rotational movement, a plurality of metallic hub portions rigidly secured to said flexible member in spaced relationship, and a non-metallic resilient sheathing bonded to said hub portions and said flexible member to enclose said hub portions and at least a portion of said flexible member therein.

10. A conveyor apparatus support structure comprising, an elongated flexible member having rotatably supportable spaced portions, resilient sheathing concentrically molded to said flexible member intermediate said spaced portions thereof, and a plurality of hub portions spaced longitudinally along said flexible member integral with said sheathing and concentric therewith, said hub portions being adapted to receive cooperating annular roller portions respectively.

11. A suspension idler for conveyor apparatus comprising, an elongated flexible member having rotatably supportable spaced portions, non-metallic resilient means molded to the outer periphery of said flexible member and extending continuously intermediate said spaced portions thereof, said resilient means forming longitudinally alternate sheathing portions and hub portions, a plurality of roller means having bores of normally smaller diameters than the diameters of said hub portions respectively, said roller means being resilient at least about the inner peripheries thereof, and said roller means being secured to said hub portions respectively in concentric relationship with said flexible member.

12. A suspension idler for conveyor apparatus comprising, an elongated flexible member having rotatably supportable spaced portions, non-metallic resilient means molded to the outer periphery of said flexible member and extending continuously intermediate said spaced portions thereof, said resilient means forming longitudinally alternate sheathing portions and hub portions, each of said hub portions having at least a portion thereof of a non-circular across section, a plurality of roller means having bores of normally smaller diameters than the diameters of said hub portions respectively, said bores having the same configurations as the outer peripheries of said hub portions respectively, said roller means being resilient at least about the inner peripheries thereof, and said roller means being secured to said hub portions respectively in concentric relationship with said flexible member.

13. A suspension idler for conveyor apparatus comprising, an elongated flexible cable having rotatably supportable spaced portions, non-metallic resilient means molded to the outer periphery of said flexible cable and extending continuously intermediate said spaced portions thereof, said resilient means forming longitudinally alternate sheathing portions and hub portions, a plurality of roller means having bores of normally smaller diameters than the diameters of said hub portions respectively, said roller means being resilient at least about the inner peripheries thereof, and said roller means being secured to said hub portions respectively in concentric relationship with said flexible cable.

14. A troughing roller assembly for use in flexible belt conveyors, said assembly having replaceable rollers and including, in combination, an elongated, flexible roller carrying member, said member comprising a metallic core having a substantially constant external diameter from end to end, a surface covering extending the entire roller supporting length of the core, said surface covering being in snug frictional engagement with the core and having a constant internal diameter over substantially the entire roller supporting length of the core, said surface covering being composed of a material having the general characteristics as to flexure and compressibility of rubber, said surface covering being unbroken over substantially the entire roller supporting length of the core, a plurality of replaceable, generally centrally apertured, substantially uniform diameter and uniform length rollers spaced along the roller supporting length of the elongated member to thereby support a flexible conveyor belt, at least those rollers near the middle of the assembly being composed of a hard, plastic wear resistant material and means for securing the replaceable rollers directly to, and in direct abutting engagement with, the covered elongated member for rotation therewith, said means including a plurality of mating projections and indentations formed in the abutting surfaces of the generally centrally located apertures in the rollers and the roller-contacting periphery of the surface covering whereby the rollers may be slid over the covered metallic core for replacement and inspection, and reinstallation.

References Cited by the Examiner
UNITED STATES PATENTS 201,096   3/78   Cowles _____ 29—234

FOREIGN PATENTS 166,885   5/54   Australia.

SAMUEL F. COLEMAN, *Primary Examiner.*

WILLIAM B. LA BORDE, *Examiner.*